United States Patent Office 3,003,880
Patented Oct. 10, 1961

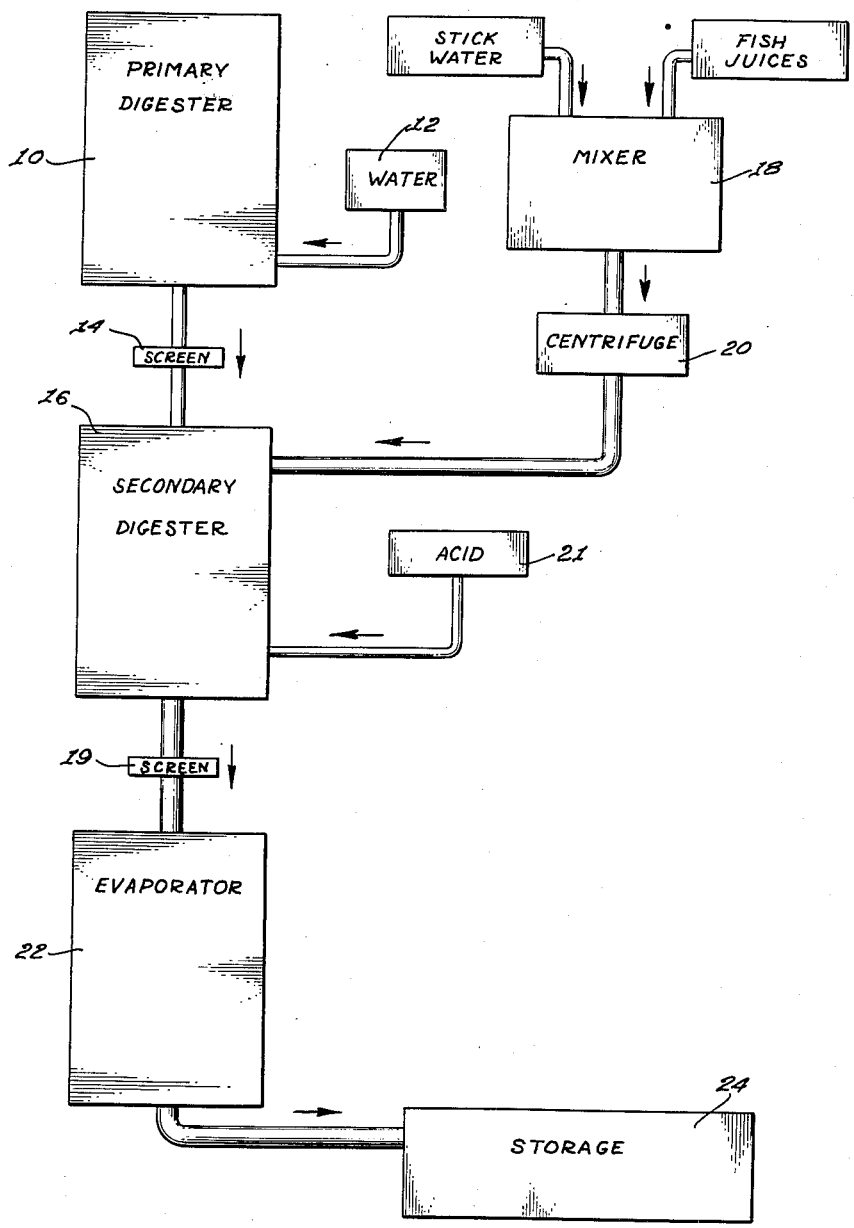

3,003,880
PROCESS FOR PREPARING A NUTRITIONAL CONCENTRATE
Reginald T. Erickson, San Juan Capistrano, Calif., assignor to Star-Kist Foods, Inc., Terminal Island, Calif., a corporation of California
Filed Mar. 14, 1958, Ser. No. 721,581
12 Claims. (Cl. 99—7)

The present invention relates generally to the fish processing industry and more particularly to a novel and improved process for preparing a nutritional concentrate from fish products.

Stick water is the common name applied to the mixture of water, oils and solids which are pressed out of fish during the processing thereof. Over a period of many years such stick water was discarded as waste. Later it was determined that stick water contained many nutritional constituents and thereafter the recovery of such constituents from stick water has been effected in various ways. Generally, the stick water is processed so as to produce an increase in concentration. The concentrate is then utilized as a vitamin-rich component for feeds for livestock and poultry. In most heretofore employed processes of this nature, an attempt is made to remove the oil phase of the stick water. Thereafter, an attempt is made to convert the suspended solids originally present in the stick water into dissolved solids. The remaining undissolved solids are removed from the stick water. The final object of such processing is to obtain a concentrate in which the dissolved solids will remain dissolved over long periods of time and under varying temperature conditions.

Examples of such processes are shown in U.S. Patents 2,118,008 and 2,372,677. In the processes disclosed in these patents the suspended solids as well as the free oil originally present in the stick water are removed as by centrifuging and filtering. Thereafter, additional solids and oils are removed by means of a chemical precipitating or coagulating step. It will be apparent that since such processes require that the major portion of the non-dissolvable solids as well as the major portion of the oils be removed, the resulting concentrate will not have as high a nutritional value as would be the case were these solids and oils left within the stick water during the processing thereof.

Other prior processes, as typified by U.S. Patents Nos. 2,454,315 and 2,525,294, do not coagulate the stick water before its concentration. Instead, the suspended solids and the free oil are first removed from the stick water as by centrifuging. The remaining suspended solids are then dissolved by effecting their digestion under the influence of an added proteolytic enzyme such as papain. When such proteolytic enzyme is added to the stick water, the temperature as well as the pH thereof is adjusted to the optimum operating pH range of the papain, the latter being stirred into the mixture while such mixture is concentrated to the desired degree. The concentrate produced by such processes will generally be higher in nutritional content than those first described hereinabove inasmuch as solely free oil is removed from the stick water and no secondary oil removal by chemical coagulation is utilized.

It is a major object of the present invention to provide a process for preparing a stick water concentrate having a higher nutritional value than concentrates prepared by means of the heretofore-proposed processes of this nature.

Another object is to provide a process of the aforedescribed nature wherein the resulting concentrate is more stable than those prepared by heretofore-proposed processes. In this regard, the process of the present invention converts substantially all the originally-suspended solids to dissolved solids. Moreover, the oil present in the concentrate after such processing will not separate out the concentrate even over extended periods of time.

Yet another object of the present invention is to provide a process for preparing a nutritional concentrate from fish stick water by effecting digestion of the suspended solids originally present in the stick water without requiring the addition of an outside proteolytic enzyme. In accordance with the present process, the proteolytic enzymes necessary for effecting such digestion are provided from the viscera of the fish from which such stick water is expressed. Accordingly, the process of the present invention may be carried out at less cost than where an outside proteolytic enzyme such as papain is employed.

An additional object of the present invention is to provide a process for preparing a nutritional concentrate from fish stick water and fish viscera which includes digesting the stick water and viscera together until substantially all of the solids therein have been dissolved by the proteolytic enzymes naturally present therein.

Yet a further object of the present invention is to provide a process for concentrating fish stick water without removing the solids originally present therein so as to provide a concentrate that is especially nutritious.

Further objects and advantages of the present invention will become apparent from the following detailed description, when taken in conjunction with the appended drawing which constitutes a flow diagram indicating schematically a preferred form of process embodying the present invention.

Referring to the drawing, the numeral 10 designates a primary digester. This primary digester 10 receives fish viscera which has been finely ground as by a hammer mill. If desired, finely ground fish scraps may additionally be received by this primary digester. Sufficient water is added from a source 12 to provide a pumpable mixture. This mixture is then violently agitated, as by pumping, while being held at a temperature between 120 to 140 degrees F. for a period sufficient for most of the suspended solids in the mixture to be dissolved. Generally, from three to ten hours are required to break down the fish solids.

At the conclusion of this primary digestion period, the resulting mixture will be passed through a screen 14 to remove bones and foreign materials and emptied into a secondary digester 16. The secondary digester 16 also receives a mixture of fish stick water and fish juices. The stick water and juices are first mixed, however, in a mixer designated 18 while heated at a temperature preferably between 180 to 200 degrees F. The fish juices are recovered from various processes in a fish canning plant, as for example, the precooking operation. After the mixing operation, the mixture of stick water and fish juices is passed through means such as a centrifuge 20 which mechanically removes the free fish oils present therein. The term "free oils" as used herein refers to those oils which may be fairly readily mechanically separated from the mixture of stick water and fish juices, as differentiated from the oil removed during a chemical coagulating step as described in the aforementioned Patents 2,118,008 and 2,372,677. It is an important feature of the present invention that the fish oils removed by such chemical coagulation in the prior art processes are permitted to remain in the stick water throughout the present process and thereby render the concentrate produced by the present process particularly nutritious.

After separation of the free oil, the mixture of stick water and fish juices pass into the secondary digester 16. It should be particularly observed at this point that the viscera which has undergone primary digestion in the digester 10 is rich in natural proteolytic enzymes. These proteolytic enzymes are employed in the secondary digester in the digestion of the suspended solids and gelatinous materials contained in the mixture of stick water and fish juices, as well as the digestion of any suspended solids remaining in the mixture coming from the primary digester 10. It has been determined that such digestion will most readily take place at a temperature of approximately 150 degrees F. Additionally, the mixture within the secondary digester 16 should be violently agitated as by pumping. A time varying between four to twenty-four hours is generally required for the secondary digestion step depending upon the amount of suspended solids which must be dissolved.

It has been found that the oils present within the material entering the secondary digester 16 will be stabilized during the secondary digestion step. Thus, after undergoing such secondary digestion such oils will not separate from the final product of the process, i.e. the nutritional concentrate. Additionally, such secondary digestion reduces the susceptibility of these oils to rancidity.

At the conclusion of the secondary digestion step the pH of the solution within the secondary digester is adjusted so as to provide the concentrate with a pH of approximately 4.5 or slightly less. In general, this requires that the pH of the solution within the secondary digester be adjusted to approximately 4.52 to 3 in order to achieve a concentrate pH of 4.5. By so adjusting the pH the keeping qualities of the concentrate is improved. While it is not essential to adjust the pH at this point, and it is in fact possible to effect such adjustment after the solution from the secondary digester has been concentrated, such adjustment is most readily effected within the secondary digester. This is true since it is easier to disperse the adjusting medium in the thinner liquid and additionally the secondary digester contains means for agitating the solution. The adjusting medium may come from a source designated 18 in the drawing and can take several forms, as for example sulphuric acid, phosphoric acid, or even lime juice.

It should be particularly noted that despite a wide variation in the proportion of stick water, fish juices and the material coming from the primary digester 10, the solution obtained by the secondary digestion step will be homogenous. The solution from the secondary digester 10 is preferably passed through a screen 20 to remove bones and foreign materials and passes to an evaporator 22. The solution is then concentrated, preferably, until it has a dissolved solids content of approximately fifty percent. After the concentrating step, the resulting concentrate may be transferred to a storage tank 24.

The resulting concentrate includes in addition to regular fish oils, a percentage of valuable glandular oils of high vitamin content, the latter being provided by the viscera. These oils will not separate from the solution and additionally they will not turn rancid. As a result, the concentrate has very little fish odor and may therefore be used in higher concentrations in feeding poultry and animals without imparting a disagreeable taste to the flesh of the animals or poultry than has been the case with prior concentrates. The solids originally present in the sources of the concentrate as suspended matter will remain dissolved in the concentrate even over extended periods of time and at ordinary temperatures. Accordingly, the concentrate will remain highly fluid and may therefore be readily handled both during shipping and use. It should additionally be noted that the utilization of the fish viscera in the present process eliminates the necessity of providing the costly processing equipment normally employed at a fish canning plant to process the viscera of the fish being canned. Additionally, by utilizing fish scrap in the preparation of a concentrate, the present process affords a maximum monetary return upon this scrap, such scrap ordinarily going into low cost products.

Various modifications and changes may be made with regard to the foregoing detailed description without departing from the spirit of the invention or the scope of the following claims.

I claim:
1. A process for preparing a nutritional concentrate which includes effecting a primary digestion of fish viscera in water, removing free oil from uncoagulated fish stick water, mixing together such stick water and the product of said primary digestion, and effecting a secondary digestion of such mixture.

2. A process for preparing a nutritional concentrate which includes effecting a primary digestion of fish viscera in water, removing free oil from uncoagulated fish stick water, mixing together such stick water and the product of said primary digestion, effecting a secondary digestion of such mixture and concentrating the product of such secondary digestion.

3. A process for preparing a nutritional concentrate which includes effecting a primary digestion of fish viscera in water, removing free oil from uncoagulated fish stick water, mixing together such stick water and the product of said primary digestion, effecting a secondary digestion of such mixture, adjusting the pH of the product of such secondary digestion whereby said concentrate will have a pH of approximately 4.5 or slightly less, and concentrating the product of such secondary digestion.

4. A process for preparing a nutritional concentrate from uncoagulated fish stick water and viscera which includes reducing said viscera to fine particles, adding water to said viscera particles, effecting a primary digestion of the mixture of water and particles, removing free oil from said stick water, mixing together such stick water and the product of said primary digestion, effecting a secondary digestion of the resultant mixture, and concentrating the product of such secondary digestion.

5. A process for preparing a nutritional concentrate from uncoagulated fish stick water and viscera which includes reducing said viscera to fine particles, adding water to said viscera particles, effecting a primary digestion of the mixture of water and particles, removing free oil from said stick water, mixing together such stick water and the product of said primary digestion, effecting a secondary digestion of the resultant mixture, adjusting the pH of the product of such secondary digestion whereby said concentrate will have a pH of approximately 4.5 or slightly less, and concentrating the product of such secondary digestion.

6. A process for preparing a nutritional concentrate from uncoagulated fish stick water and viscera which includes reducing said viscera to fine particles, adding water to said viscera particles, effecting a primary digestion of the mixture of water and particles by agitating such mixture at a temperature between approximately 120 to 140 degrees F. for a period sufficient for most of the suspended solids in such mixture to become dissolved, removing free oil from said fish stick water, effecting a secondary digestion of a second mixture of said stick water and the product of said primary digestion at a temperature of approximately 150 degrees F. for a period sufficient for substantially all of the suspended solids in said second mixture to become dissolved, and concentrating the product of such secondary digestion.

7. A process for preparing a nutritional concentrate from uncoagulated fish stick water and viscera which includes reducing said viscera to fine particles, adding water to said viscera particles, effecting a primary digestion of the mixture of water and particles by agitating such mixture at a temperature between approximately 120 and 140 degrees F. for a period sufficient for most of the suspended solids in such mixture to become dissolved, removing free oil from said fish stick water, effecting a secondary digestion of a second mixture of said stick water and the product of said primary digestion at a temperature of approximately 150 degrees F. for a period sufficient for substantially all of the suspended solids in said second mixture to become dissolved, adjusting the pH of the product of such secondary digestion whereby said concentrate will have a pH of approximately 4.5 or slightly less, and concentrating the product of such secondary digestion.

8. A process for preparing a nutritional concentrate from fish viscera uncoagulated, stick water and juices which includes reducing said viscera to fine particles, adding water to said viscera particles, effecting a primary digestion of the mixture of water and particles, mixing together said stick water and juices at a temperature between 180 and 190 degrees F., removing free oil from said stick water and juices, effecting a secondary digestion of said stick water and juices and the product of said primary digestion, and concentrating the product of such secondary digestion.

9. A process for preparing a nutritional concentrate from fish viscera uncoagulated, stick water and juices which includes reducing said viscera to fine particles, adding water to said viscera particles, effecting a primary digestion of the mixture of water and particles, mixing together said stick water and juices at a temperature between 180 and 190 degrees F., removing free oil from said stick water and juices, effecting a secondary digestion of said stick water and juices and the product of said primary digestion, adjusting the pH of the product of such secondary digestion whereby said concentrate will have a pH of approximately 4.5 or slightly less, and concentrating the product of such secondary digestion.

10. A process for preparing a nutritional concentrate from fish viscera uncoagulated, stick water and juices which includes reducing said viscera to fine particles, adding water to said viscera particles, effecting a primary digestion of the mixture of water and particles by agitating such mixture at a temperature between approximately 120 to 140 degrees F for a period sufficient for most of the suspended solids in such mixture to become dissolved, mixing together said stick water and juices at a temperature between 180 and 190 degrees F., removing free oil from said stick water and juices, effecting a secondary digestion of said stick water and juices and the product of said primary digestion at a temperature approximating 150 degrees F for a period sufficient for substantially all of the suspended solids in the mixture being digested to be dissolved, and concentrating the product of such secondary digestion.

11. A process for preparing a nutritional concentrate from fish viscera uncoagulated, stick water and juices which includes reducing said viscera to fine particles, adding water to said viscera particles, effecting a primary digestion of the mixture of water and particles by agitating such mixture at a temperature between approximately 120 and 140 degrees F. for a period sufficient for most of the suspended solids in such mixture to become dissolved, mixing together said stick water and juices at a temperature between 180 and 190 degrees F., removing free oil from said stick water and juices, effecting a secondary digestion of said stick water and juices and the product of said primary digestion at a temperature approximating 150 degrees F. for a period sufficient for substantially all of the suspended solids in the mixture being digested to be dissolved, adjusting the pH of the product of such secondary digestion whereby said concentrate will have a pH of approximately 4.5 or slightly less, and concentrating the product of such secondary digestion.

12. A process as set forth in claim 11 where fish scrap is added to and treated concurrently with said viscera.

References Cited in the file of this patent
UNITED STATES PATENTS

| | | |
|---|---|---|
| 2,454,315 | Gunther et al. | Nov. 23, 1948 |
| 2,806,790 | Bedford | Sept. 17, 1957 |